United States Patent [19]

Frye et al.

[11] Patent Number: 4,536,529

[45] Date of Patent: Aug. 20, 1985

[54] FLAME RETARDANT THERMOPLASTIC COMPOSITIONS

[75] Inventors: Robert B. Frye, Albany, N.Y.; Michio Zembayashi, Ohta, Japan

[73] Assignee: General Electric Company, Waterford, N.Y.

[21] Appl. No.: 563,354

[22] Filed: Dec. 20, 1983

[51] Int. Cl.³ .................. C08K 5/09; C08L 23/06; C08L 23/12; C08L 25/06

[52] U.S. Cl. .................. 524/284; 106/18.12; 260/DIG. 24; 524/265; 524/266; 524/268; 524/400; 524/506; 524/577; 524/583; 524/585; 524/587

[58] Field of Search ............... 524/265, 266, 268, 284, 524/400, 506, 577, 583, 585, 587; 260/DIG. 24; 106/18.12

[56] References Cited

U.S. PATENT DOCUMENTS

| | | | |
|---|---|---|---|
| 2,744,079 | 5/1956 | Kilbourne et al. | 524/268 |
| 2,888,424 | 5/1959 | Precopio | 524/430 |
| 3,079,370 | 2/1963 | Precopio | 525/333.8 |
| 3,086,966 | 4/1963 | Mageli | 525/387 |
| 3,214,422 | 10/1965 | Mageli | 525/387 |
| 4,209,566 | 6/1980 | Betts | 428/389 |
| 4,235,978 | 11/1980 | Luce et al. | 525/101 |
| 4,247,446 | 1/1981 | Betts et al. | 524/412 |
| 4,265,801 | 5/1981 | Moody | 524/430 |
| 4,273,691 | 6/1981 | MacLaury et al. | 524/396 |
| 4,369,289 | 1/1983 | Keogh | 524/506 |
| 4,387,176 | 6/1983 | Frye | 524/268 |
| 4,390,656 | 6/1983 | Weise et al. | 524/506 |
| 4,405,425 | 9/1983 | Schiller et al. | 524/400 |

*Primary Examiner*—Ronald W. Griffin

[57] ABSTRACT

Flame retardant thermoplastic compositions are described which comprise 30–98% by weight thermoplastic, 1–40% by weight of a silicone fluid, 1–20% by weight of metal soap precursors and 1–20% by weight of a silicone resin. Such compositions offer simpler processing, improved impact resistance and other advantages over conventional flame retardant thermoplastic compositions.

20 Claims, No Drawings

FLAME RETARDANT THERMOPLASTIC COMPOSITIONS

FIELD OF THE INVENTION

The present invention relates to flame retardant compositions and particularly flame retardant thermoplastics such as polyolefins. Specifically, the invention relates to blends of organic polymer, certain silicone polymers and silicone resins and precursors of metal soaps which form thermoplastic compositions exhibiting good flame retardancy.

BACKGROUND OF THE INVENTION

Many attempts have been made previously to provide flame retardant thermoplastics, however typically plastic materials have been heavily filled with additives until the desired degree of flame retardancy has been achieved, the loadings being large enough in many instances to detract from the physical properties of the plastic base material. Several patents, such as U.S. Pat. No. 4,265,801 (Moody et al.), U.S. Pat. No. 4,235,978 (Luce et al.), U.S. Pat. No. 4,209,566 (Betts et al.) and U.S. Pat. No. 4,247,446 (Betts et al.), also describe compositions which make use of halogenated organic materials and/or heavy metal compounds (e.g., lead- or antimony-based) which produce acidic and perhaps toxic bi-products when burned.

In U.S. Pat. No. 4,273,691 (MacLaury et al.) describes flame retardant compositions comprising a polyolefin, certain metal salts of carboxylic acids and a silicone, such as a silicone gum. In commonly assigned, copending application Ser. No. 344,167, filed Jan. 29, 1982, and U.S. Pat. No. 4,387,176 (Frye), thermoplastic compositions are described which derive flame retardancy from additive packages comprising low viscosity silicone fluids plus Group IIA metal carboxylic acid salts and a blend of Group IIA metal organic compound plus silicone plus silicone resin, respectively.

All of the aforementioned patents and applications are incorporated herein by reference. It will be apparent that the present invention provides novel flame retardant compositions that represent a significant improvement over prior art compositions.

The present invention is based on the discovery that efficient flame retardant thermoplastics can be prepared by combining during compounding in the correct proportions certain metal soap precursors, for example stearic acid and a reactive magnesium compound (e.g., magnesium hydroxide or magnesium ethoxide), which are precursors to magnesium stearate, with certain silicone fluids and silicone resins and adding them to a major proportion of a thermoplastic. Such flame retarding additives impart flame retardance at relatively low concentrations, cause less reduction in mechanical properties than conventional flame retardants, dramatically improve impact resistance, are believed to produce less toxic products when exposed to flame, and act to improve gloss and processability.

SUMMARY OF THE INVENTION

It is therefore an object of the present invention to provide novel thermoplastic compositions having a high degree of flame retardancy.

It is a further object of the present invention to provide a combination of silicone fluid, silicone resin and metal soap precursors which is effective to render thermoplastics flame retardant.

It is a further object of the present invention to provide flame retardant thermoplastics exhibiting improved electrical properties and processability.

These and other objects will become apparent to those skilled in the art upon consideration of the disclosure herein of a flame retardant composition comprising:

(A) 30% to 98% by weight of thermoplastic;
(B) 1% to 40% by weight of a silicone fluid comprised of RR'SiO units, where R and R' represent, independently, a substituted or unsubstituted monovalent organic radical of 1 to 20 carbon atoms, and having a viscosity of about 600 to 300,000,000 centipoise at 25° C.;
(C) 1% to 20% by weight of metal soap precursors comprising:
 (i) 50% to 100% by weight of a carboxylic acid containing at least 6 carbon atoms, and
 (ii) 0% to 50% of a reactive Group IIA metal compound; and
(D) 1% to 20% of a silicone resin.

DESCRIPTION OF THE PREFERRED EMBODIMENTS

The present invention is based on the discovery that the precursors of certain Group IIA metal carboxylates (metal soaps), for example stearic acid with a reactive magnesium compound, can be used in combination with certain silicone fluids and silicone resins to impart improved flame retardant properties to a variety of organic polymers, such as polyolefins, polyesters, polycarbonates, polystyrenes, etc. (hereinafter collectively referred to as "thermoplastics"). Furthermore the metal soap precursors can be added directly during melt compounding of the thermoplastic, no pre-mixing or pre-reacting is necessary. It has been found that the flame retardancy of such thermoplastics is substantially improved, as shown by verticle burn tests and horizontal burn tests, when the aforementioned soap precursors and silicone fluid and silicone resin additives are incorporated into such thermoplastics.

It is contemplated that the organic polymers which can be used to make the flame retardant compositions of the present invention are, for example, low density polyethylene (LDPE) having a density of 0.91 g/cm³ to 0.93 g/cm³; high density polyethylene (HDPE) having a density of 0.94 g/cm³ to 0.97 g/cm³; polypropylene having a density of about 0.91 g/cm³, polystyrene, LEXAN ® polycarbonate, and VALOX ® polyester, both manufactured by General Electric Company, and other polymers such as, ionomers, polyurethanes, thermoplastic elastomers co- and ter-polymers of acrylontirile, butadiene and styrene; as well as acrylic, polybutylene, acetal resin, ethylene-vinyl acetate, polymethylpentene, polyvinylchloride, and polyphenylene oxide etc. The term "silicone fluids" includes essentially linear polydiorganosiloxanes consisting essentially of chemically combined units of the formula,

wherein R and R' are monovalent organic radicals. These organic radicals will preferably be selected from the class consisting of $C_{(1-8)}$ alkyl radicals, $C_{(6-13)}$ aryl radicals, $C_{(6-20)}$ alkenyl radicals halogen-substituted such radicals, cyanoalkyl radicals, etc. The aforementioned polydiorganosiloxanes are preferably in the form of silanol or trimethylsilyl chainstopped siloxane fluids having an approximate viscosity of 600 to 300,000,000 centipoise at 25° C.

The metal soap precursors contemplated by the present invention are, for example, the carboxylic acid or related carboxylic compound (e.g. anhydride, acid chloride, ester, etc.) and reactive metal compound components which can be used to form metal soaps such as magnesium stearate, calcium stearate, barium stearate, strontium stearate, and other carboxylates of Group IIA metals. Suitable carboxylic acids or related carboxylic compounds will contain at least 6 carbon atoms, as it is believed that approximately 6 carbon atoms or more are required to disperse Group IIA metals in the silicone fluids and, in turn, in the thermoplastic. It is believed that little advantage would be found in utilizing carboxylic acids containing more than about 20 carbon atoms, although they may be found useful for specific situations. Preferred carboxylic acids include stearic acid, isostearic acid, oleic acid, palmitic acid, myristic acid, undecylenic acid, 2-ethylhexanoic acid, hexanoic acid, and the like. Stearic acid is most preferred.

Another possible component in the contemplated metal soap precursors is a reactive metal compound selected from periodic Group IIA elements, such as magnesium, calcium, strontium, barium, etc. It is believed that introduction of both the carboxylic acid and the reactive metal compound components into the thermoplastic composition during melt compounding may form in situ a metal soap or other compound effective to improve the flame retardancy of the thermoplastic. Carboxylic acid salts which may be formed in this manner include stearates (including isostearates), oleates, palmitates, myristates, laurates, undecylenates, 2-ethyl-hexanoates, hexanoates, etc.

Presently the Group IIA metals are not believed to be effective flame retardants by themselves. However, it may be possible that Group IIA metal additives are effective when complexed with other organic moieties, and therefore, the metals are used effectively because of their ability to readily disperse throughout the silicone material. It is therefore contemplated that the Group IIA metal soaps described herein include other organic complexes of such metals as are effective for use as flame retardants. Salts of the following acids, for example, may be suitable: sulfinic, sulfonic, aromatic sulfenic, sulfamic, phosphinic and phosphoric acids.

The remaining major ingredient of the flame retardant fomulation is a class of materials referred to as silicone resin. The present inventor has discovered that remarkably effective flame retardant thermoplastic compositions can be provided when one or more of such a silicone resin is combined with the previously described ingredients to provide a flame retardant composition. Silicone resins are well known materials coming in a variety of forms. Approximately 2 to 40 percent by weight of the total additive formulation will be silicone resin which is soluble in the above described silicone oil (i.e., fluid or gum) and which is effective for imparting improved flame retardancy to the compositions of the present invention. Among the preferred silicone resins are MQ silicone resins. The expression "MQ silicone resin" refers to the fact that such resins are typically comprised primarily of monofunctional M units of the formula $R_3SiO_{0.5}$ and tetrafunctional Q units of the average formula $SiO_2$ having a specified ratio of M to Q units. A notable effective silicone resin for use in the present invention is polytrimethylsilylsilicate which can have a ratio of, approximately, 0.3 to 4.0M units per Q unit. A particularly effective masterbatch formulation might preferably contain from 6 to 30 percent by weight of such MQ resin and have a ratio of, approximately, 0.6 to 2M units per Q unit. An example of a commercially available MQ silicone resin in General Electric SR545 (60% MQ resin solids in toluene). A preferred method of utilizing such an MQ resin solution is to mix it with the silicone oil component and thereafter remove the solvent. The solvent can be removed by well known methods, e.g., by distillation at moderate temperatures.

It is contemplated that other silicone oil soluble forms of solid silicone resins may be effective for use in the flame retardant compositions of the present invention. Indeed, MT and TQ silicone resins (where T represents trifunctional $RSiO_{1.5}$ units) may also be effective as well as mixtures and copolymers of each of the resins mentioned. These silicone resins are well known materials and are readily available. A criterion for suitability is that such effective silicone resinous materials be soluble or dispersible in the silicone oil base.

Additionally it is to be noted that although the additive composition specifies the silicone oil (essentially D functional) and silicone resin (M,D,T, or Q functional) as discrete ingredients to be admixed, it is intended that the present invention encompass reaction products of such materials which may be equally effective as flame retardant additives. It is also foreseeable that a copolymer containing requisite M, D, T or Q functionality may be utilized in place of discrete silicone oil and silicone resin consituents.

Surprisingly, it has been discovered that the carboxylic acid component of the metal soap precursor also provides some degree of flame retardancy in combination with the silicone fluid and resin. The carboxylic acids, therefore, may advantageously be used to replace a portion or all of the other metal soap precursors or other flame retardant additives employed in a given thermoplastic composition. For example, reducing the magnesium content by replacing a portion of the magnesium stearate (or magnesium stearate precursors) by a compound such as stearic acid could produce several advantages, such as improving the electrical properties of the plastic, and improving the shelf stability of a silicone premix (since magnesium stearate may catalyze silanol condensation).

The relative proportions of carboxylic acid and reactive metal compound contemplated, where both precursor components are used, will vary according to the nature of the reactive metal compound, the type of acid, the type of metal soap thought to be formed in situ, and other factors that will be familar to persons skilled in this art. However, by way of illustration, where magnesium hydroxide or magnesium ethoxide is used in conjunction with stearic acid, amounts of 0 to 100 parts by weight of the magnesium base per 100 parts of the stearic acid have produced good flame retardancy where together they comprised approxmately 4½ weight percent of a polypropylene formulation. Obviously, some experimentation to arrive at the optimal proportions for a given thermoplastic formulation is contemplated.

In addition to the aforementioned ingredients, the flame retardant compositions of the present invention can contain additional ingredients, such as fillers, antioxidants, and additional additives. In particular instances, ingredients such as decabromodiphenylether, alumina trihydrate and talc also can be utilized. If desired, heat activated peroxides can be employed when utilizing polyolefins as the organic polymer. Suitable reactive peroxides are disclosed in U.S. Pat. Nos. 2,888,424, 3,079,370, 3,086,966 and 3,214,422 (all incorporated herein by reference). Suitable peroxide crosslinking agents include organic tertiary peroxides which decompose at a temperature above about 146° C. and thereby provide free-radicals. The organic peroxides can be used in amounts of from about 2 to 8 parts by weight of peroxide per 100 parts of organic polymer. A preferred peroxide is dicumyl peroxide, while other peroxides such as VulCupR ® of Hercules, Inc., a mixture of para- and meta-, -bis(t-butylperoxy)-diisopropylbenzene, etc., can be used. Curing co-agents such as triallyl cyanurate can be employed in amounts of up to about 5 parts by weight of co-agent, per 100 parts of the polymer if desired. The polyolefins can be irradiated by high energy electrons, X-ray and like sources.

The proportions of all the various ingredients can vary widely depending upon the particular application intended. For example, for effective flame retardance there can be employed per 100 parts (by weight) of organic polymer from about 0.5 to 20 parts of the silicone fluid, 0.5 to 20 parts at the silicone resin and about 0.5 to 20 parts of the metal soap precursor. However, greater or smaller amounts may suffice in particular applications, and as previously indicated, other additives may be included. Alumina trihydrate, for example, can be utilized in a proportion of from 1 to 70 parts, and organic halogen compounds can be added at from about 5 to 30 parts, per 100 parts of the organic polymer. Reinforcing and non-reinforcing fillers are also contemplated.

In the practice of the invention, the flame retardant compositions can be made by mixing together the organic polymer with the silicone fluid, the silicone resin, and the Group IIA metal soap precursors by means of any conventional melt compounding apparatus, such as a Banbury mixer, twin screw extruder, or two-roll rubber mill. However a twin screw extruder is expected to give the most reproducible product. Order of addition of the particular constituents does not appear to be critical, however, those skilled in the art will be able to optimize the flame retardant compositions contemplated herein without undue experimentation. Preferably, all the ingredients are formulated together except those which are sensitive to the temperatures in the range of from about 150° C. to about 200° C., such as heat decomposable peroxides. The ingredients are therefore at a temperature sufficient to soften and plasticize the particular organic polymer if feasible. An effective procedure, for example, would be to uniformly blend the aforementioned ingredients at a suitable temperature omitting the organic peroxide, then introduce the organic peroxide at a lower temperature to uniformly incorporate it into the mixture.

It is envisioned that the flame retardant composition of the present invention can be extruded onto a conductor and in particular instances, crosslinked depending on whether a peroxide curing agent is present. Of course, there are numerous other applications where the flame retardant compositions of the present invention may be used to great advantage. Such materials may be successfully molded, extruded or compressed to form numerous useful products such as moldings, sheets, webbing, fibers and a multitude of other flame retardant plastic or polyolefin products. Thus, the flame retardant compositions of the present invention can be utilized in such applications as appliance housings, hairdriers, TV cabinets, smoke detectors, etc., automotive interiors, fans, motors, electrical components, coffee makers, pump housings, power tools, etc. Such flame retardant compositions might also be utilized in fabrics, textiles and carpet as well as many other applications.

Those skilled in the art will appreciate that there are several methods for testing and comparing relative flame retardancy of thermoplastics. Among the most well known are limiting oxygen index and horizontal and vertical burn tests.

Underwriters' Labatories Bulletin UL-94 describes a "Burning Test for Classifying Materials", hreinafter referred to as "UL-94". In accordance with this test procedure, materials are rated V-O, V-I, or V-II based on the results of testing five specimens, which are evaluated according to the following criteria;

- V-O: Average flaming and/or glowing after removal of the igniting flame shall not exceed 5 seconds, and no individual specimen shall drip particles which ignite absorbant cotton or burn longer than 10 seconds.
- V-I: Average flaming and/or glowing after removal of the igniting flame shall not exceed 25 seconds, and no individual specimens shall drip particles which ignite absorbant cotton or burn longer than 30 seconds.
- V-II: Average flame and/or glowing after removal or igniting flame shall not exceed 25 seconds (with no individual burn greater than 30 seconds) and the specimens drip flaming particles which ignite absorbant cotton.

The vertical burn tests conducted in connection with the following examples essentially follow the test procedures described in UL-94. However, the tests, since they were designed for screening purposes only and not for qualification of the products for specific applications, are not replicated to the extent set forth in the procedure. Accordingly, reference to UL-94 classifications V-O, V-I and V-II in the following examples represents the classification for the sample formulations which are believed will produce articles meeting the pertinent criteria of UL-94.

In order that those skilled in the art may better understand the pratice of the present invention, the following examples are given by way of illustration and not by way of limitation.

EXAMPLES 1-3

Three thermoplastic compositions were compounded on a 2-roll mill at 380° F. (193° C.), granulated, compression molded into slabs, cut into test specimens ("flammability bars" ⅛"×½"×6") and evaluated in the UL-94 vertical burn test. The compositions were formulated as follows: (Amounts are parts by weight)

|  | Silicone* | Magnesium Stearate | Decabromodiphenyl Oxide | Talc | Polypropylene | Stearic Acid |
|---|---|---|---|---|---|---|
| Sample 1 | 19 | 8.7 | 13.7 | 10 | 148.6 | — |

-continued

|  | Silicone* | Magnesium Stearate | Decabromodiphenyl Oxide | Talc | Polypropylene | Stearic Acid |
|---|---|---|---|---|---|---|
| Sample 2 | 19 | 4.7 | 13.7 | 10 | 148.6 | 4 |
| Sample 3 | 19 | — | 13.7 | 10 | 148.6 | — |

*silicone component was prepared from a silanol-endstopped polydimethylsiloxane (100,000 cps) and an MQ silicone resin.

The flammability test was run on duplicate bars for each composition and the average self-extinguishing time in seconds reported:

| UL-94 Self-Extinguishing Time (Vertical Burn) | |
|---|---|
| Sample 1 | 12 seconds, no drips |
| Sample 2 | 13 seconds, no drips |
| Sample 3 | variable (flaming drips, one bar was consumed) |

Examples 1 and 2 show that replacing about half of the magnesium stearate by stearic acid does not reduce the flame retardance. However, example 3 demonstrates that omitting both magnesium stearate and stearic acid causes the formulation to fail the vertical burn test.

EXAMPLES 4–10

Seven compositions were compounded and tested as in Examples 1–3. The formulations were as follows: (Amounts are in parts by weight)

|  | Silicone | Mg Stearate | Decabromodiphenyl Oxide | Talc | Polypropylene | Other |
|---|---|---|---|---|---|---|
| Sample 4 | 19 | 8.7 | 13.7 | 10 | 148.6 | — |
| 5 | 19 | 4.7 | 13.7 | 10 | 148.6 | |
| 6 | 19 | 2.7 | 13.7 | 10 | 148.6 | stearic acid, 4 parts |
| 7 | 19 | 4.7 | 13.7 | 10 | 148.6 | stearic acid, 8.7 parts |
| 8 | 19 | 4.7 | 13.7 | 10 | 148.6 | — |
| 9 | 19 | 4.7 | 13.7 | 10 | 148.6 | octadecanol 4 parts |
| 10 | 19 | 4.7 | 13.7 | 10 | 148.6 | 1,12-dodecane dicarboxylic acid, 4 parts |

The flammability test was run as before, with the following results:

| UL-94 Self-Extinguishing Time (Vertical Burn) | |
|---|---|
| Sample 4 | 11 seconds, no drips |
| Sample 5 | 13 seconds, no drips |
| Sample 6 | 18 seconds, no drips |
| Sample 7 | 32 seconds, flaming drips |
| Sample 8 | 25 seconds, flaming drips |
| Sample 9 | 24 seconds, no drips |
| Sample 10 | consumed, flaming drips |

Examples 4, 5 and 6 again demonstrate that stearic acid can replace some of the magnesium stearate, and Example 7 shows that the material even self extinguishes when the magnesium stearate is totally replaced by stearic acid. Examples 8, 9, and 10 are controls showing that the stearic acid is indeed maintaining the flame retardance and that neither octadecanol nor dedecanedicarboxylic acid are acceptable substitutes.

EXAMPLES 11–15

Five samples were prepared and evaluated as in previous examples. The formulations were as follows: (All amounts are in parts by weight)

|  | Silicone | Mg Stearate | Decabromodiphenyl Oxide | Talc | Polypropylene | Other |
|---|---|---|---|---|---|---|
| Sample 11 | 19 | 8.7 | 13.7 | 10 | 148.6 | — |
| 12 | 19 | — | 13.7 | 10 | 148.6 | stearic acid, 8.7 parts |
| 13 | 19 | — | 13.7 | — | 148.6 | stearic acid, 8.7 parts |
| 14 | 19 | — | 13.7 | — | 148.6 | lithium stearate, 8.7 parts |
| 15 | 19 | 8.7 | 13.7 | 10 | 148.6 | lithium stearate, 8.7 parts |

The following results were observed:

| UL-94 Self-Extingishing Time (Vertical Burn) | |
|---|---|
| Sample 11 | 20 seconds, no drips |
| Sample 12 | 31 seconds, flaming drips |
| Sample 13 | variable (flaming drips, one bar was consumed) |
| Sample 14 | consumed |
| Sample 15 | consumed |

Examples 11, 12, and 13 suggest that the functioning of stearic acid may require talc as a co-agent. Examples 14 and 15 demonstrate that a Group I metal stearate does not work in this system.

EXAMPLES 16–21

Six samples were prepared and evaluated as in previous examples. The formulations were as follows: (All amounts are in parts by weight)

|  | Silicone | Mg Stearate | Mg Ethoxide | Stearic Acid | Polypropylene |
|---|---|---|---|---|---|
| Sample 16 | 39.2 | 6.6 | — | — | 154.4 |
| 17 | 39.2 | — | — | — | 154.4 |
| 18 | 39.2 | — | 1.3 | — | 154.4 |
| 19 | 39.2 | — | 4.0 | — | 154.4 |
| 20 | 39.2 | — | 1.4 | 6.3 | 154.4 |
| 21 | 8* | — | 2.3 | — | 180 |

*100,000 mPa.s polydimethylsiloxane alone, no silicone resin.

The following results were observed in horizontal burn testing (10 second ignitions, two trials): (SE=self-extinguishing time; ND=no drips; FD=flaming drips which ignite absorbent cotton)

| Horizontal Burn Test | | |
|---|---|---|
|  | Trial A | Trial B |
| Sample 16 | 21 sec. SE, ND | 12 sec. SE, ND |
| 17 | 2 in.-104 sec., FD | 2 in.-96 sec., FD |
| 18 | 2 in.-81 sec., FD | 2 in.-90 sec., FD |
| 19 | 2 in.-72 sec., FD | 2 in. 85 sec., FD |
| 20 | 33 sec. SE, ND | 26 sec. SE, ND |
| 21 | 2 in.-95 sec., FD | 2 in.-103 sec., FD |

Examples 16–21 show the importance of the stearic acid and magnesium base to the compositions' flame retardance. In their absence the composition will not self extinguish, even in the less rigorous horizontal burn test.

EXAMPLES 22-27

Six samples were prepared and evaluted as in previous examples. The formulations were as follows: (All amounts are in parts by weight)

|  | Silicone | Mg Stearate | Decabromodiphenyl Oxide | Talc | Polypropylene | Other |
|---|---|---|---|---|---|---|
| Sample 22 | 19 | 8.7 | 13.7 | 10 | 148.7 | — |
| 23 | 19 | 4.7 | 13.7 | 10 | 148.7 | stearic acid, 4 parts |
| 24 | 19 | — | 13.7 | 10 | 148.7 | stearic acid, 7.7 parts + 1 part Mg Oxide |
| 25 | 19 | — | 13.7 | 10 | 148.7 | stearic acid, 7.7 parts + 1 part Mg(OH)$_2$ |
| 26 | 19 | — | 13.7 | 10 | 148.7 | — |
| 27 | 19 | 8.7 | 13.7 | 10 | 148.7 | — |

The following reslts were observed in vertical burn testing (four trails): (SE=self-extinguishing time; ND=no drips; FD=flame drips)

|  | Trials | | | | |
|---|---|---|---|---|---|
|  | A | B | C | D | Ave. |
| Sample 22 | SE=9 sec.; ND | SE=17 sec.; ND | SE=8 sec.; ND | SE=13 sec. ND | 12 sec. |
| 23 | SE=19 sec.; | SE=17 sec.; | SE=6 sec.; | SE=8 sec. | 13 sec. |
| 24 | SE=56 sec.; FD | SE=17 sec.; FD | SE=29 sec.; FD | SE=18 sec. FD | 30 sec. |
| 25 | SE=19 sec.; ND | SE=7 sec.; ND | SE=17 sec.; ND | SE=20 sec. ND | 16 sec. |
| 26 | SE=18 sec.; FD | SE=35 sec.; FD | consumed | consumed | — |
| 27 | SE=17 sec.; ND | SE=38 sec.; ND | SE=10 sec.; ND | SE=11 sec. ND | 19 sec. |

These examples reconfirm that magnesium stearate can be at least partially replaced by stearic acid and completely replaced by stearic acid plus a reactive magnesium compound. Example 24 indicates that magnesium oxide is a less preferred base in this formulation, and Example 26 shows the performance of a non-flame-retarded formulation lacking a metal soap or one or more of its precursors.

Obviously, further embodiments and variations of the present invention are possible in light of the foregoing disclosure; however, any such incidental changes made in the invention are within the full intended scope of the appended claims.

What is claimed is:

1. A flame retardant composition comprising:
   (A) 30% to 98% by weight of thermoplastic;
   (B) 1% to 40% by weight of a silicone fluid comprised of RR'SiO units, where R and R' represent, independently, substituted or unsubstituted monovalent organic radicals of 1 to 20 carbon atoms, and having a viscosity of about 600 to 300,000,000 cps at 25° C.;
   (C) 1% to 20% by weight of metal soap precursors comprising:
   (i) 50% to 100% by weight of a carboxylic acid or related carboxylic compound containing at least 6 carbon atoms, and
   (ii) 0% to 50% of a reactive Group IIA metal compound,
   (D) 1% to 20% of a silicone resin.

2. A composition as defined by claim 1, wherein said thermoplastic is a high density polyethylene.

3. A composition as defined by claim 1, wherein said thermoplastic is a low density polyethylene.

4. A composition as defined by claim 1, wherein said thermoplastic is polypropylene.

5. A composition as defined by claim 1, wherein said thermoplastic is polystyrene.

6. A composition as defined by claim 1, wherein said silicone is polydimethylsiloxane fluid.

7. A composition as defined in claim 1, wherein the metal soap precursor comprises (i) a carboxylic acid selected from the group consisting of stearic acid, isostearic acid, oleic acid, palmitic acid, myristic acid, undecylenic acid, lauric acid, hexanoic acid, and 2-ethylhexanoic acid.

8. A composition as defined in claim 7, wherein said carboxylic acid is stearic acid.

9. A composition as defined in claim 1, wherein the metal soap precursor comprises (i) a carboxylic acid selected from the group consisting of stearic acid, isostearic acid, oleic acid, palmitic acid, myristic acid, undecylenic acid, lauric acid, hexanoic acid, and 2-ethylhexanoic acid; and (ii) a reactive Group IIA metal compound.

10. A composition as defined in claim 9, wherein said reactive Group IIA metal compound is selected from magnesium hydroxide or magnesium ethoxide.

11. A composition as defined in claim 1, which also contains an effective amount of an organic peroxide.

12. A solid article comprising the composition of claim 1.

13. A solid substrate coated with the compositions of claim 1.

14. An additive for thermoplastics effective to render said thermoplastics flame retardant, comprising:
   (A) 1 to 40 parts by weight of a silicone fluid comprised of polymeric units of the formula RR'SiO, wherein R and R' represent, independently, substituted or unsubstituted monovalent organic radicals of 1 to 20 carbon atoms, and having a viscosity of about 600 to 300,000,000 cps at 25° C.; and
   (B) 1 to 20 parts by weight of metal soap precursors comprising (i) 50% to 100% by weight of a carboxylic acid or related carboxylic compound containing at least 6 carbon atoms, and (ii) 0% to 50% by weight of a reactive Group 11A metal compound;

(C) 1 to 20 parts by weight of a silicone resin comprised of monofunctional M units of the average formula $R_3SiO_{0.5}$ and tetrafunctional Q units of the average formula $SiO_2$, and having an average ratio of, approximately, 0.3 to 4.0 M units per Q unit.

15. A masterbatch formulation as in claim 14, which further contains approximately 1 to 98 parts by weight of thermoplastics or mixture of thermoplastics, and which is effective for rendering additional amounts of comparible thermoplastics flame retardant.

16. A process for rendering thermoplastics flame retardant comprising the steps: Adding to 30% to 90% by weight of thermoplastic
  (a) 1% to 20% by weight of metal soap precursors comprising (i) 50% to 100% by weight of a carboxylic acid containing at least 6 carbon atoms, and (ii) 0% to 50% by weight of a reactive Group IIA metal compound;
  (b) 1% to 20% by weight of a silicone fluid of the formula, $XR_2SiO\text{-}(RR'SiO)_n\text{-}SiR_2X$, wherein R and R' are, independently, substituted or unsubstituted monovalent organic radicals of from 1 to 20 carbon atoms, n is an integer such that said silicone fluid has a viscosity in the range of 600 to 300,000,000 cps at 25° C., and X is a R or a hydroxyl or alkoxyl radical; and
  (c) 1% to 20% by weight of a silicone resin comprised of monofunctional M units of the average formula $R_3SiO_{0.5}$ and tetrafunctional Q units of the average ratio of, approximately, 0.3 to 4.0M units per Q unit.

17. A flame retardant composition comprising:
  (A) 30% to 98% by weight of thermoplastic;
  (B) 1% to 40% by weight of a silicone fluid comprised of RR'SiO units, where R and R' represent, independently, substituted or unsubstituted monovalent organic radicals of 1 to 20 carbon atoms, and having a viscosity of about 600 to 300,000,000 cps at 25° C.;
  (C) 1% to 20% by weight of a metal soap precursor selected from the group consisting of carboxylic acids and related carboxylic acid anhydrides, acid chlorides and esters containing at least 6 carbon atoms; and
  (D) 1% to 20% by weight of a silicone resin.

18. A composition as defined in claim 17, wherein the metal soap precursor (C) is selected from stearic acid, isostearic acid, oleic acid, palmitic acid, myristic acid, undecylenic acid, lauric acid, hexanoic acid, and 2-ethylhexanoic acid.

19. A composition as defined in claim 17, wherein the metal soap precursor (C) further contains, per 100 parts by weight of the carboxylic acid or related carboxylic compound, an amount up to about 23 parts by weight of a reactive Group IIA metal compound.

20. In a flame retardant composition comprising:
  (A) 30% to 98% by weight of thermoplastic;
  (B) 1% to 40% by weight of a silicone fluid comprised of RR'SiO units, where R and R' represent, independently, substituted or unsubstituted monovalent organic radicals of 1 to 20 carbon atoms, and having a viscosity of about 600 to 300,000,000 cps at 25° C.;
  (C) 1% to 20% by weight of a silicone resin; and
  (D) a flame-retarding amount of a Group IIA metal soap,
the improvement wherein said metal soap is partially replaced by a carboxylic acid or related carboxylic compound containing at least 6 carbon atoms, such that said flame retardant composition exhibits improved impact resistance, gloss and processability without a significant reduction is flame retardance.

* * * * *